United States Patent
Bargury et al.

(10) Patent No.: US 11,388,163 B2
(45) Date of Patent: Jul. 12, 2022

(54) LEAST-PRIVILEGE RESOURCE PERMISSION MANAGEMENT

(71) Applicant: MICROSOFT TECHNOLOGY LICENSING, LLC., Redmond, WA (US)

(72) Inventors: Michael Zeev Bargury, Ramat Gan (IL); Gal Malka, Tel Aviv (IL)

(73) Assignee: MICROSOFT TECHNOLOGY LICENSING LLC., Redmond, WA (US)

( * ) Notice: Subject to any disclaimer, the term of this patent is extended or adjusted under 35 U.S.C. 154(b) by 346 days.

(21) Appl. No.: 16/779,939

(22) Filed: Feb. 3, 2020

(65) Prior Publication Data

US 2021/0243190 A1     Aug. 5, 2021

(51) Int. Cl.
| | |
|---|---|
| *H04L 29/06* | (2006.01) |
| *H04L 9/40* | (2022.01) |
| *G06N 3/08* | (2006.01) |
| *H04L 41/147* | (2022.01) |
| *G06F 16/901* | (2019.01) |

(Continued)

(52) U.S. Cl.
CPC .......... *H04L 63/10* (2013.01); *G06F 16/9024* (2019.01); *G06F 21/604* (2013.01); *G06N 3/08* (2013.01); *H04L 41/145* (2013.01); *H04L 41/147* (2013.01)

(58) Field of Classification Search
CPC ..... H04L 63/10; H04L 41/147; H04L 41/145; G06N 3/08; G06F 21/604; G06F 16/9024
See application file for complete search history.

(56) References Cited

U.S. PATENT DOCUMENTS

| | | | |
|---|---|---|---|
| 10,031,785 B2* | 7/2018 | Gonzalez | G06F 9/5083 |
| 2007/0174899 A1* | 7/2007 | Broberg | G06F 21/6218 |
| | | | 726/4 |

(Continued)

FOREIGN PATENT DOCUMENTS

EP     3567506 A1     11/2019

OTHER PUBLICATIONS

"This Talk 1) Node embeddings Map nodes to low-dimensional embeddings 2) Graph neural networks Deep learning architectures for graph-structured data 3) Applications", Retrieved From: https://web.archive.org/web/20191127023742if_/http://snap.stanford.edu:80/proj/embeddings-www/files/nrltutorial-part1-embeddings.pdf, Nov. 27, 2019, pp. 1-59.

(Continued)

*Primary Examiner* — Chau Le

(57) ABSTRACT

The least-privilege permission needed for an identity, such as a user account, application, user group, or process, to access a resource of a tenant of a cloud service is determined from a predicted future resource usage. The predicted future resource usage is based on the resource usage history of an identity, the resource usage history of similar identities and the resource usage history of its peers. Similar identities are determined from node embeddings of a graph that represents the assigned permissions of an identity to a resource and the usage activity at a resource. The permissions needed to perform the predicted future resource usage is compared with the current permission assignments to determine the bare minimum permission that an identity needs for its ongoing and future workflow.

20 Claims, 5 Drawing Sheets

(51) Int. Cl.
H04L 41/14 (2022.01)
G06F 21/60 (2013.01)

(56) References Cited

U.S. PATENT DOCUMENTS

| 2014/0359692 | A1* | 12/2014 | Chari ..................... G06F 21/31 |
| | | | 726/1 |
| 2019/0327271 | A1* | 10/2019 | Saxena ................. H04L 63/104 |
| 2020/0358778 | A1* | 11/2020 | Gopinathapai ..... G06F 16/2246 |
| 2022/0067191 | A1* | 3/2022 | Upton ................. G06F 16/9038 |

OTHER PUBLICATIONS

"International Search Report and Written Opinion Issued in PCT Application No. PCT/US21/014237" dated Apr. 26, 2021, 13 Pages.

* cited by examiner

LEAST-PRIVILEGE RESOURCE PERMISSION MANAGEMENT

BACKGROUND

The proliferation of the Internet has changed the workplace. An organization's Information Technology (IT) resources may be hosted on a cloud service which enables access from any location, from different types of applications (e.g., web-based application, mobile application, desktop application) and from different types of devices (e.g., mobile, Internet of Things (IoT), desktop, laptop, etc.). Although the cloud service provides increased productivity to the workplace, the complexity of the cloud service presents various kinds of security vulnerabilities that need to be overcome in order to protect the network resources. One such security vulnerability is created when broad permissions are granted to a user account, application or process that exceeds the permissions needed to perform legitimate, intended tasks. The assignment of broad permissions may lead to unintentional and malicious changes and data leaks.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The least-privilege permission needed for an identity, such as a user account, application, user group or process, to access resources of a tenant of a cloud service is determined from a prediction of the future resource usage of the identity. The predicted future resource usage is based on a resource usage history of the identity, a resource usage history of similar identities and a resource usage history of the identity's peers. The permissions needed for the identity to perform the predicted future resource usage is then compared with the current permissions assigned to the identity to determine the bare minimum permission that the identity needs for its ongoing workflow.

The resource usage of similar identities is a good predictor of the future activities that may be performed by an identity on a resource. In order to determine which identities have similar usage behavior, a graph is generated that represents the permission assignments of the identities to the resources of a tenant of a cloud service. The graph includes nodes that represent an identity, a permission or a resource and edges that identify the assigned permissions to a resource and the usage activity of a resource by an identity. Random walks are used to generate paths representing unsupervised samples that train a deep learning based model to compute node embeddings that capture the contextual and semantic similarity of the data represented in the graph.

The differences in the node embeddings is used to identify similar identities having similar resource usage. The resource usage history of the similar identities is a good predictor of the future activities that an identity may need for its ongoing workflow. The permissions needed to perform the predicted future activities is used to determine the bare minimum permission.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Figure 1:
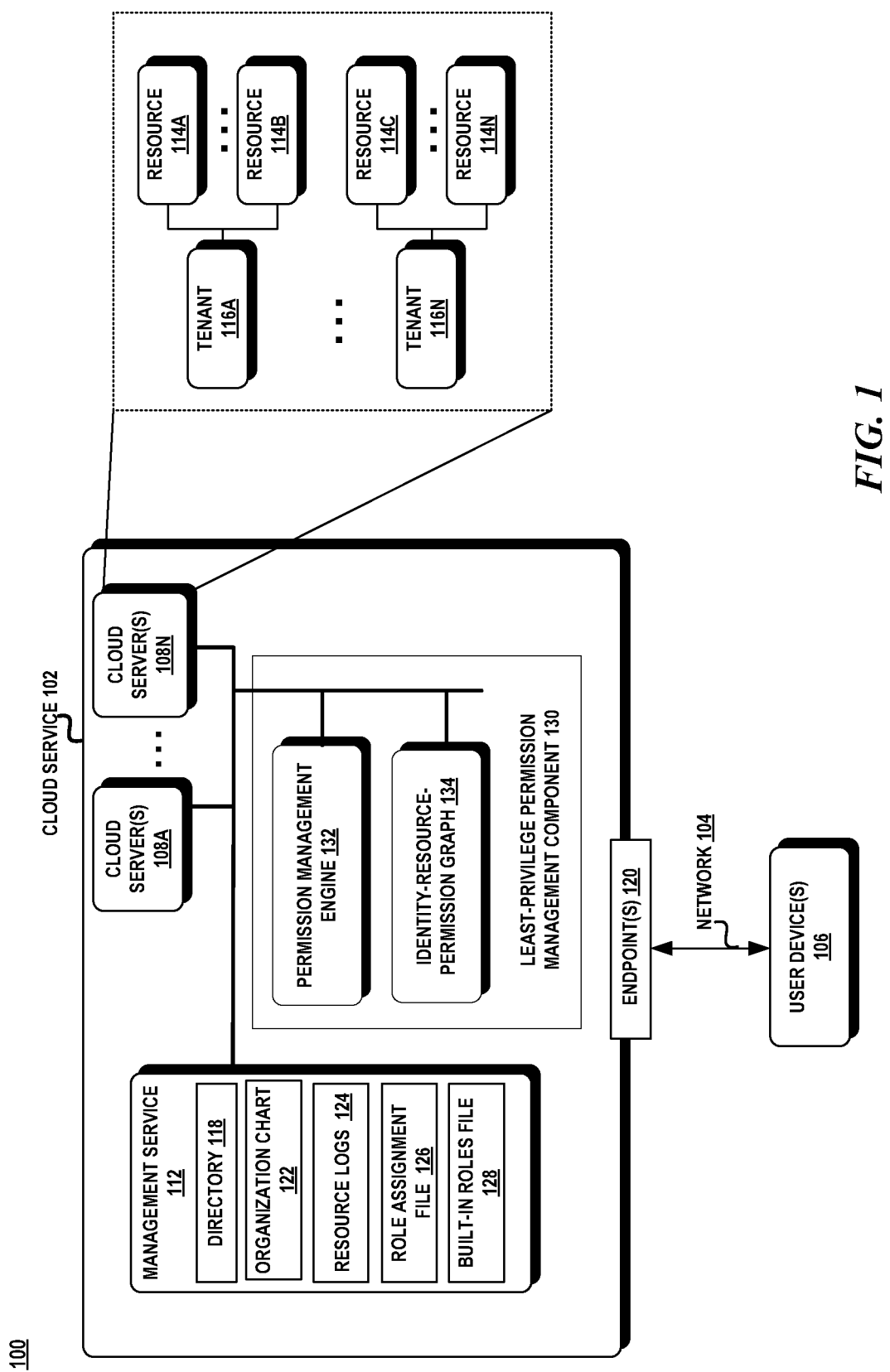
FIG. 1 illustrates an exemplary system to automatically determine the least-privilege permission for an identity to access a resource within a cloud environment.

Aspects of the present invention address the identification of the bare minimum permission needed for an identity (e.g., user account, process, user group, and application) to accomplish a legitimate task in a computing environment. A least-privilege permission ensures that resources hosted in a computing environment are accessed with the minimum set of permissions needed to perform intended actions on a resource. In this manner, the resource is protected from security risks, such as data leakage and data loss.

In one aspect, the computing environment is a cloud service that hosts the resources of multiple tenants. A tenant is a directory that is associated with an enterprise, organization, group, user account or entity that subscribes to the cloud service. A subscription is a logical entity that provides entitlement to access resources. A tenant contains resources, such as virtual machines, applications, application programming interfaces (APIs), storage accounts, services, etc. that are grouped into a subscription. An identity is a user account, user group, application, or process that has been given one or more permissions to access a resource.

The cloud service hosts the tenant's resources and controls access to the resources. Examples of a cloud service include without limitation, Microsoft Azure®, Google Cloud Platform™ service, iCloud®, and the like. A resource is an entity that is managed by the cloud service, such as a virtual machine, virtual network, storage account, database, web-accessible application, and services. Resources may belong to a resource group or subscription. A resource group is a logical grouping of the resources so that they can be managed as a single entity.

Access to a resource is controlled through the assignment of a role. Each identity is assigned a role which includes a set of permissions. A set of permissions may include zero or more permissions. A role is assigned at a scope level. A scope may include a single resource or a grouping of resources, such as resource groups or subscriptions. For example, an Owner role has all the permissions associated with a resource and the right to delegate these permissions to others. A Contributor role has the permissions needed to create and manage a resource but not to grant access to the resource to others. A Reader role has the permission that allows a resource to be read.

Initially, a default set of permissions may be assigned to an identity if a role is not assigned to an identity. The default set of permissions may include rights that are not needed for an identity to perform its tasks. A security risk may be created by granting a role with broad permissions that exceed the permissions needed for the identity to perform its tasks. The techniques described herein reduce the set of permissions granted to an identity based on the resource usage history of the identity, the resource usage history of other identities that access similar resources, and the resource usage history of its peers so that an appropriate set of permissions is identified that do not disrupt the workflow of the identity.

Attention now turns to a further discussion of the system, devices, components, and methods utilized in determining the bare minimum permission for an identity.

System

FIG. 1 illustrates a block diagram of an exemplary system 100 in which various aspects of the invention may be practiced. The system 100 may be configured with a cloud service 102 that operates within a multi-tenant environment that serves multiple customers of a tenant. A cloud service 102 is a service available on demand for users through a publicly-accessible network, such as the Internet.

A tenant 116A-116N ("116") is a directory that is associated with an enterprise, organization, group, user or entity that subscribes to the cloud service 102. A tenant 116 contains resources, such as virtual machines, applications, application programming interfaces (APIs), storage accounts, services, etc. that are grouped into a subscription. A subscription is an object that represents a folder where the resources reside. A tenant 116 may have many subscriptions. The cloud service 102 hosts the tenant's subscriptions and controls access to the resources contained within a subscription. A subscription may be fee-based or free and lasts for a designated length of time. Examples of a cloud service include without limitation, Microsoft Azure®, Google Cloud Platform™ service, iCloud®, and the like.

The cloud service 102 includes one or more cloud servers 108A-108N ("108") that facilitate hosting the resources of the tenants. A cloud server 108 may be part of a datacenter that provides distributed computing services such as cloud computing services. A data center can provide pooled resources on which customers or tenants can dynamically provision and scale applications as needed without having to add servers or additional networking. The datacenter can be configured to communicate with local computing devices used by cloud consumers including personal computers, mobile devices, embedded systems, or other computing devices. Within the data center, computing devices can be configured as servers, either as standalone devices or individual blades in a rack of one or more other server devices. A tenant may initially use one virtual machine on a server to run an application. The datacenter may activate additional virtual machines on a server or other servers when demand increases, and the datacenter may deactivate virtual machines as demand drops.

A datacenter may be an on-premises, private system that provides services to a single enterprise user or may be a publicly (or semi-publicly) accessible distributed system that provides services to multiple, possibly unrelated customers and tenants, or may be a combination of both. Further, a datacenter maybe contained within a single geographic location or may be distributed to multiple locations across the globe and provide redundancy and disaster recovery capabilities. For example, the datacenter may designate one virtual machine on a server as the primary location for a tenant's application and may activate another virtual machine on the same or another server as the secondary or back-up in case the first virtual machine or server fails.

A tenant 116 may communicate with other devices, including each other or with devices located outside the cloud service 102 via a network 104, such as the Internet. In one example, a tenant 116 may communicate with other devices via assigned network addresses, such as an assigned internet protocol (IP) address. In one example, a user of a device 106 can log in to a tenant 116 and access resources 114A-114N ("114"). In some examples, the resources 114 are available to authorized users, and the user may have further restrictions via permissions from a set of permission levels to each authorized user for each resource in the cloud service 102.

A management service 112 helps users log onto and access the resources 114 of a tenant 116 including external resources such as software as a service applications and applications on the tenant's network and intranet such as with a single sign on (SSO). In one aspect, the management service 112 provides similar features as a domain directory service such as the configuration of user groups, authentication and authorization. However, the management service 112 differs from domain directory services since the domain directory services are unable to manage web-based services.

The management service 112 is configured to support web-based services that apply REST (REpresentational State Transfer) API (Application Programming Interface) interfaces for many software as a service applications. The management service 112 applies different protocols than the domain directory service. For example, the management service 112 applies protocols that can work with web-based services such as authentication protocols including Security Assertion Markup Language (SAML), Open Authorization (OAuth), an identity layer on top of OAuth protocol such as OpenID Connect, and Web Services Federation (WS-Federation). In one aspect, each tenant may apply an instance of management service, such as a directory 118 for the tenant. The directory 118 may be configured to include the tenant's users, groups, and applications and may perform identify and access management functions for the tenant's resources.

A user device 106 communicates with the cloud service through REST APIs. A REST API is used to request information or access to a resource from the cloud service 102 using an HyperText Transfer Protocol (HTTP) method. The cloud service 102 responds by returning an HTTP response. The REST APIs are transmitted to an endpoint 120 of the cloud service 102. An endpoint 120 is a port that connects a device to a service hosted by the cloud service 102. The endpoint 120 is addressed by a uniform resource locator (URL) that the user device 106 uses to access a resource or service hosted by the cloud service 102. The cloud service 102 may have multiple endpoints 120. In one aspect, the endpoints 120 are API endpoints, each of which are configured to receive requests through a designated REST API.

The management service 112 enables a customer of the cloud service (i.e., organization, entity, tenant, etc.) to deploy, manage, and monitor its resources as a group and to control access to these resources. The management service 112 manages the resources through an assignment of a role. A role is a set of permissions that identify actions or operations that may be performed on a resource. A role is assigned at a scope level. A role may be assigned to all the resources of a subscription, to a single resource, or to all the resources of a resource group. The role assignments file 126 includes the role assignments that have been made in each subscription to each identity.

The built-in roles file 128 includes a list of the roles available within the cloud service 102 and the permissions contained within each role. For example, in the Microsoft Azure® cloud service, there are seventy built-in roles. There are four commonly-used roles: Owner; Contributor; Reader; and User Access Admin. The role of an Owner has permissions that allow full access to all resources and the ability to grant access to others. There are no non-allowed actions. The role of Contributor has permissions that allow the security principal to create and manage all types of resources without the ability to grant access to resources to others. The role of a Reader has permissions to only read a resource. The role of a User Access Admin has permissions to manage user access to resources.

Other exemplary roles are: Classic Virtual Machine Contributor which allows for the management of classic virtual machines without access to them or to the virtual network or storage account they are connected to; SQL Server Contributor allows for the management of SQL servers and databases without access to them or their security-related polices; and Data Purger allows for purging of analytic data.

A resource log 124 contains all the actions performed on a resource 114 by an identity. A resource 114 writes an entry in the resource log 124 each time an access and use is made to the resource 114. There may be one resource log per subscription, per resource group or per resource. An entry in a resource log 124 may identify the identity accessing the resource, the actions performed by the identity on the resource, and the time at which the access was made. The entries in the resource log 124 are used to obtain the resource usage history of an identity.

An organization chart 122 identifies the peers of a user or user account within an entity or organization that utilize the resources of the cloud service 102. Alternatively, the organization chart 122 may be a listing of related groups of users working on a same project.

The cloud service 102 may include a least-privilege permission management component 130 that identifies an appropriate set of permissions for an identity. The least-privilege permission management component 130 may include a permission management engine 132 and an identity-resource-permission graph 134. The permission management engine 132 identifies an appropriate set of permissions for an identity based on a predicted future resource usage. The identity-resource-permission graph identifies the permissions granted to each resource and identity and the usage activity of each resource by an identity.

It should be noted that FIG. 1 shows components of the system in one aspect of an environment in which various aspects of the invention may be practiced. However, the exact configuration of the components shown in FIG. 1 may not be required to practice the various aspects and variations in the configuration shown in FIG. 1 and the type of components may be made without departing from the spirit or scope of the invention. For example, this disclosure is not limited to a cloud service and the techniques described herein may be practiced with other systems using permissions to control access to shared resources.

Figures 2A, 2B:
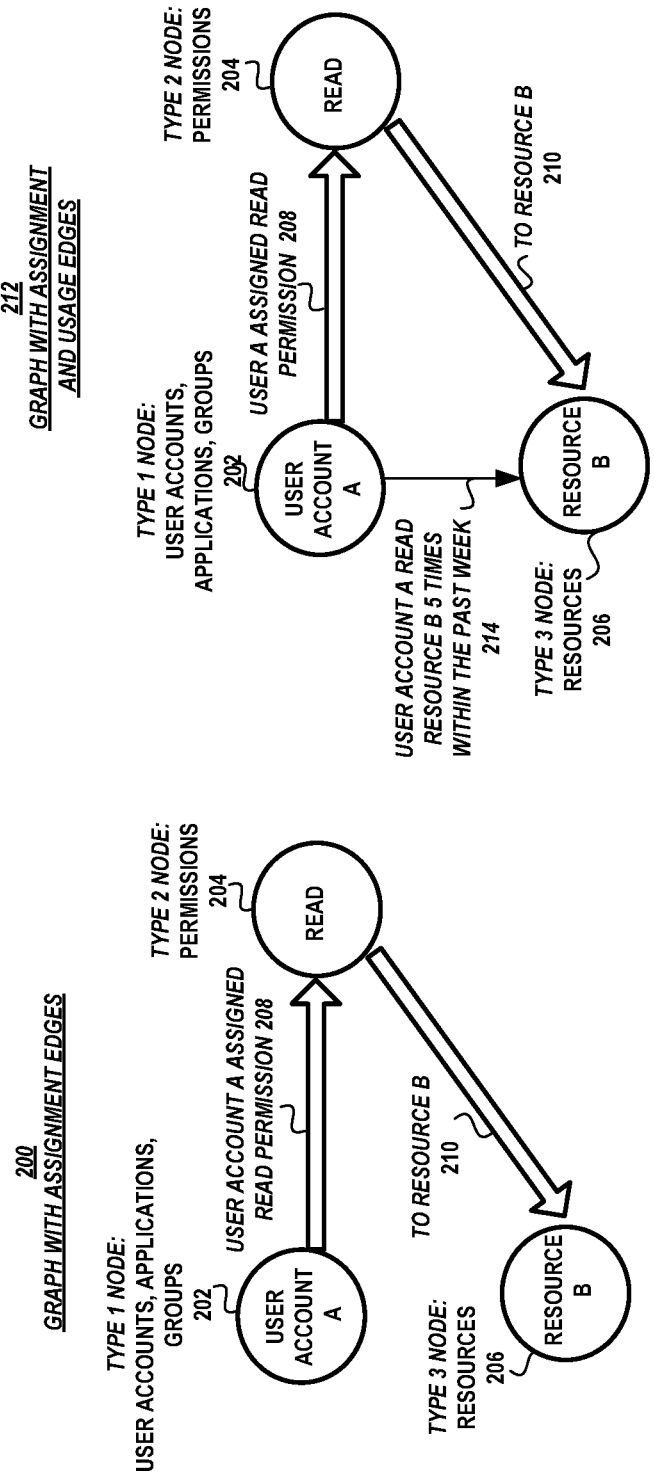
FIG. 2A is an exemplary identity-resource-permission graph having nodes and edges, where the edges represent permission assignments.
FIG. 2B is an exemplary identity-resource-permission graph having nodes and edges, where the edges represent permission assignments and usage activity.

FIGS. 2A-2B illustrate exemplary identity-resource-permission graphs. An identity-resource-permission graph is a directed acyclic graph having nodes connected to edges. There are three types of nodes. A first node type (type 1) represents an identity which may be a user account, an application, process, or a user group. A second node type (type 2) represents one or more permissions and the third node type (type 3) represents a resource. There are two types of edges. The first edge type represents the assignment relationship between the two connected nodes. The second edge type represents the usage activity associated with the two connected nodes.

As shown in FIG. 2A, graph 200 has nodes 202, 204, 206 and edges 208, 210. Node 202 is a type 1 node that represents a user account, an application, or user group. Node 204 is a type 2 node which represents one or more permissions and node 206 is a type 3 node which represents resources. Edges 208, 210 are assignment edges. Edge 208 represents that user account A is assigned a read permission and edge 210 represents that the read permission is to resource B.

FIG. 2B shows graph 212 with assignment and usage edges. Graph 212 has the same nodes and assignment edges shown in FIG. 2A with the addition of usage edge 214. A usage edge 214 connects an identity with a resource and indicates the usage activity of the identity node to the resource. As shown in FIG. 2B, usage edge 214 indicates that user account A has read resource B five times in the past week. The usage edge 214 may indicate the permission used (e.g., read, write, read/write, all), the frequency of the access (e.g., 5 times, twice a day, thrice weekly), and the time span of the usage activity (e.g., within the past week, past 2 days).

Methods.

Attention now turns to a description of the various exemplary methods that utilize the system and devices disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 3:
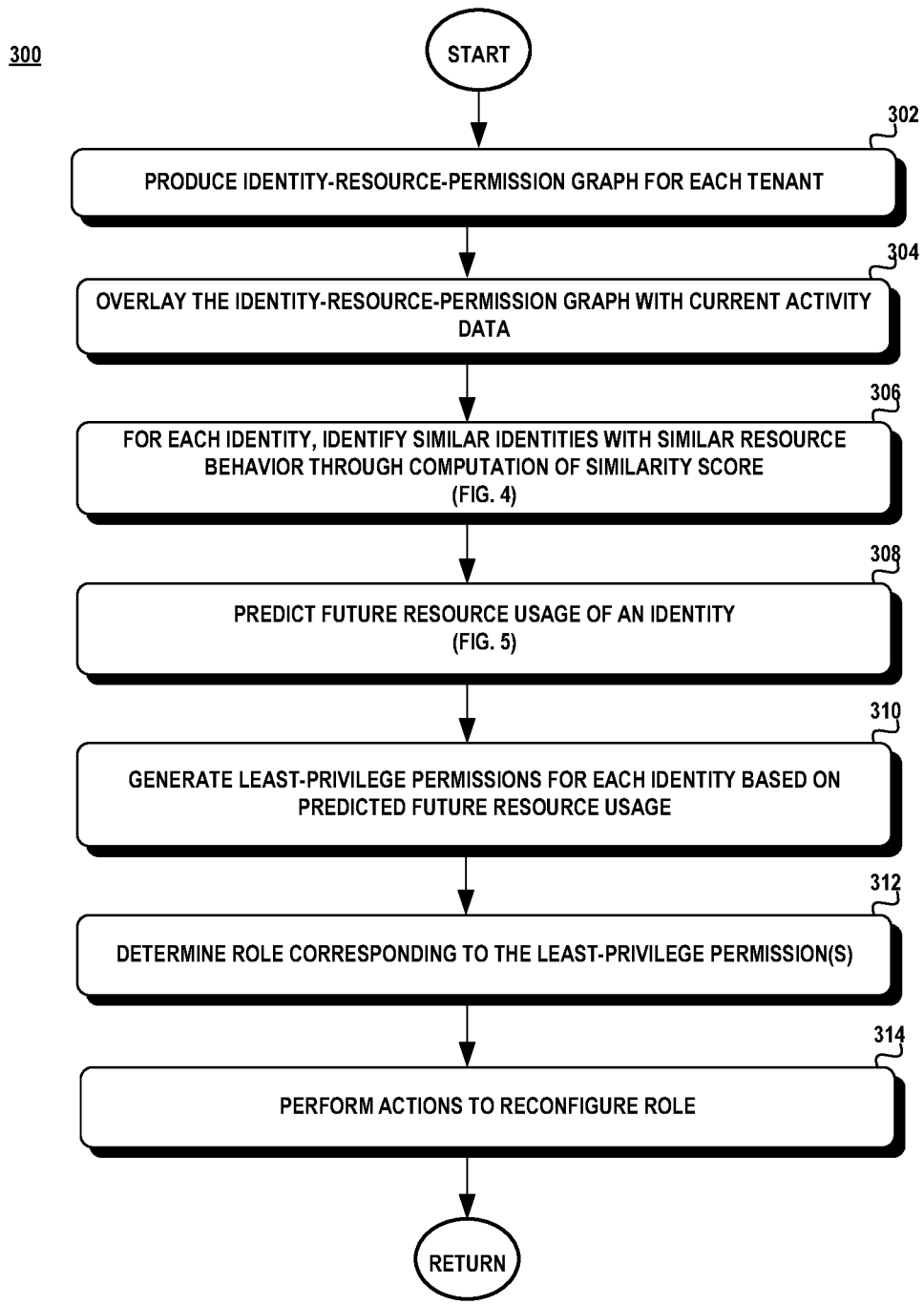
FIG. 3 is a flow diagram illustrating an exemplary method for determining the least-privilege permission for an identity.

FIG. 3 illustrates an exemplary method 300 to determine the least-privilege permissions for an identity. Referring to FIG. 1 and FIG. 3, the permission management engine 132 generates an identity-resource-permission graph 134 for each tenant (block 302). Initially, the identity-resource-permission graph 134 contains nodes representing user accounts, applications, processes, and user groups and edges representing the permission assignments for a resource. The permission management engine 132 obtains the user accounts, applications, processes, and user groups that are configured with a permission to access a resource in a particular tenant. The permission management engine 132 may obtain the identities associated with a tenant from the directory 118 and the permission assignments from the role assignment file 126.

In some aspects, a cloud service may include a role-based access control system (RBAC) and/or an identity and access management (IAM) system (not shown). The RBAC system contains the user accounts, applications, processes and user groups having access to the resources and the permissions granted to each identity through their assigned roles. Additionally, the identities may be obtained from an identity and access management system (IAM) system associated with the cloud service which facilitates the management of digital identities.

The permission management engine 132 overlays the usage activity for each resource into the identity-resource-permission graph 134 by adding a usage edge between the identity and the resource (block 304). The usage edge indicates the permissions used to access the resource, the frequency of access, and the time period in which the access occurred. The usage activity may be obtained from the resource logs 124 in the management service 112. Alternatively, the usage activity may be obtained from the tenant tracks the usage activity.

Next, the permission management engine 132 identifies similar identifies for each identity (block 306). The permission management engine 132 then derives a similarity score for each identity. The similarity score is used to identify the identities that have similar resource usage. Identities that access similar resources will have a high score and identities that use different resources will have a low score. A similarity score is generated for each identity node in the graph. The difference in the similarity score for an identity node is then used to identify those identities that have similar resource usage behavior.

Figure 4:
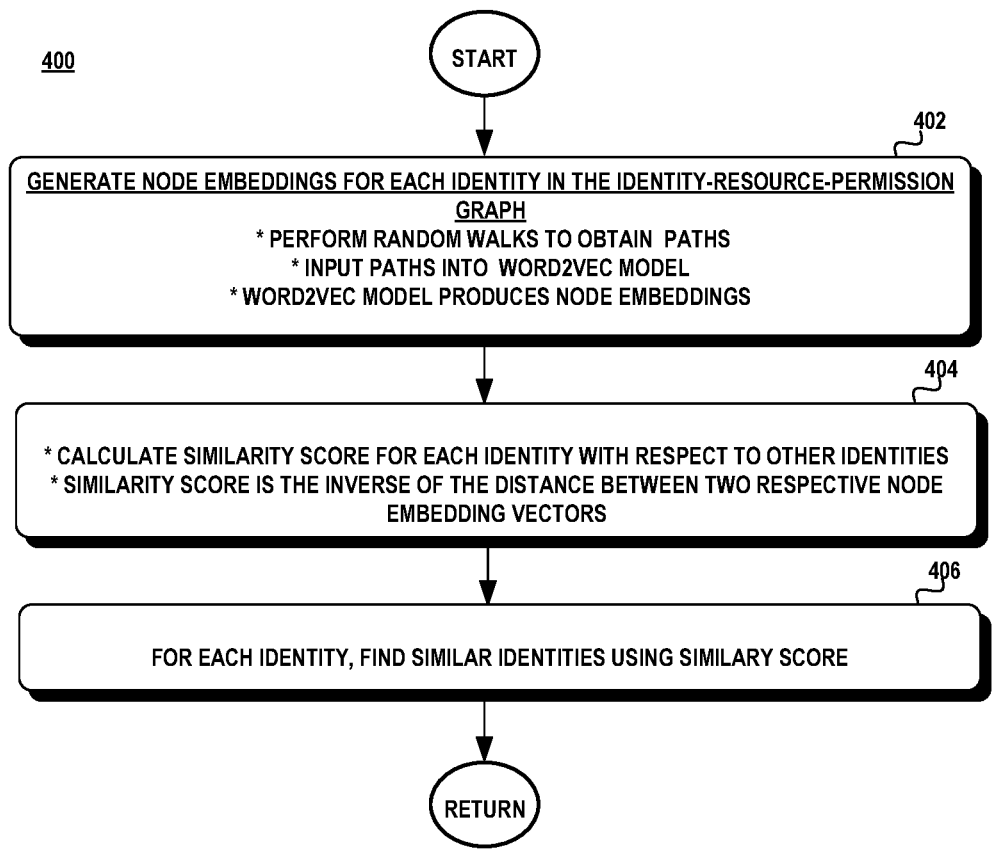
FIG. 4 is a flow diagram illustrating an exemplary method for deriving a similarity score for each identity.

FIG. 4 illustrates an exemplary method 400 for generating a similarity score for each identity. Turning to FIGS. 1 and 4, the permission management engine 132 generates a node embedding for each identity in the identity-resource-permission graph (block 402).

A graph is a natural representation of a collection of entities and the relationships between them. Representation learning is a technique for incorporating the information from the graph into a deep learning based machine learning model, such as a node embedding for each identity node of the identity-permission-resource graph. A node embedding is a low-dimensional representation of the discrete data found in the graph as a continuous vector of real numbers. Similar nodes will have similar node embeddings. The node embeddings are then used to identify similar nodes based on the distances between their respective vector representation.

The computation of the node embeddings in a graph may be represented mathematically as a maximum likelihood optimization problem. Let G=(V, E) be the identity-resource-permission, G, having vertices or nodes, V, and edges E. There is a mapping function f: V→ $\mathbb{R}^d$, from nodes, V, to feature representations, $\mathbb{R}^d$, where d is the number of dimensions in a feature representation. For every node u∈V, the network neighborhood, $N_S$ (u), of node u is generated through a neighborhood sampling strategy S, such as a normalized random walk. The following objective function is optimized using scalar gradient descent by maximizing the log-probability of observing network neighborhood $N_S$(u) for a node u conditioned on its feature representation given by $$f:\max_f \Sigma_{u \in V} \log P(N_S(u)|f(u)).$$

Random walks are used to represent the structure and relationships inherent in the identity-resource-permission graph. A random walk starts at a randomly selected node and moves to a random neighbor for a predefined number of steps. The random walk generates paths through the graph of a given length thereby generating samples used to learn a feature representation of a node. The samples capture the contextual and semantic relationships between the nodes, such as the permissions assigned to perform actions on a resource by an identity and the usage activity of a resource by each identity.

A random walk W from a source node r∈V with a given length l may be represented as W. Let $w_j$ be the j-th node in a walk, W, where $w_0$=r is the first node in W. Node $w_j$ can be generated by the normalized probability $P(w_j| w_{j-1})$:

$$P(w_j = q \mid w_{j-1} = p) = \begin{cases} \frac{1/d(q)}{Z_p}, & \text{if } (p, q) \in E, \\ 0, & \text{otherwise} \end{cases}$$

where the degree of node v is denoted as d(v), N(v) denotes the set of neighbor nodes v, and $$Z_p = \sum_{q' \in N(p)} \frac{1}{d(q')}$$

is the normalization term.

The paths generated by the random walks $W_n = \{W_{(t-2)}, W_{(t-1)}, \ldots, W_t, W_{(t+1)}, W_{(t+2)}\}$ are input into an encoder. In one aspect, the encoder is the Word2Vec model. A Word2Vec model is a convolutional neural network that uses an embedding learning algorithm to generate node embeddings. In one aspect, a continuous bag-of-word (CBOW) algorithm is used. CBOW is a predictive deep learning based encoder that computes continuous dense vector representations of words that capture contextual and semantic similarity. However, it should be noted that the techniques described herein are not limited to a particular encoder and that other encoders may be utilized as well, such as node2vec, doc2vec, and FastText.

Once the node embeddings are generated for each identity, similarity scores are generated for each pair of identities (block 404). A similarity score is computed as the inverse of the difference between two node embeddings. The similarity score may be represented as 1/(Ni−Nj), where Ni is a node embedding for node i and Nj is a node embedding for node j. The difference, (Ni−Nj), may be computed as the cosine similarity, the L1 norm, or L2 distance. The similarity score is used to identify similar identifies having similar resource usage (block 406). Identities having a high similarity score are considered similar and identities having a low similarity score are not considered similar.

Figure 5:
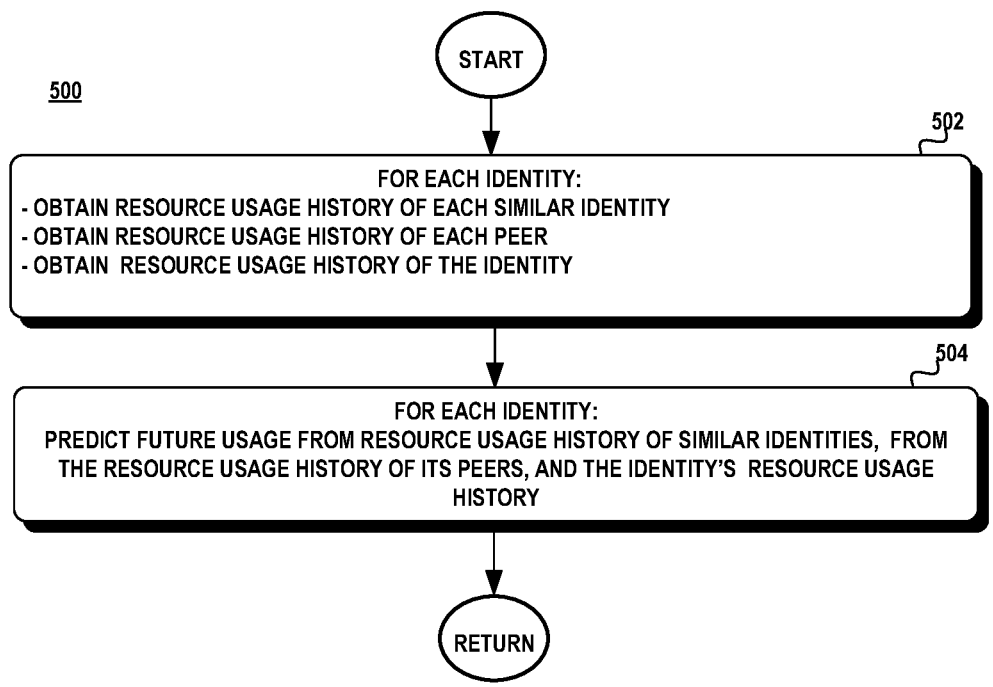
FIG. 5 is a flow diagram illustrating an exemplary method for predicting future usage of a resource by an identity.

Turning back to FIG. 3, after the similar identities are found, the permission management engine 132 determines the predicted future usage of an identity based on the resource usage history of the similar identities, the resource usage history of the identity, and the resource usage history of its peers (block 308). Turning to FIGS. 1 and 5, there is shown a method 500 for computing the predicted future usage of an identity.

For each identity, the permission management engine 132 finds the resource usage history for each similar identity, the resource usage history for each of its peers, and its resource usage history (block 502). The resource usage history may be obtained from the resource logs 124 in the management service 112 or from the tenant 116. The resource usage history indicates the resource accessed, the permissions used to access the resource, the frequency of access, and the time period in which the access was made.

Additionally, the permission management engine 132 finds the peers of an identity from an organization chart 122. An identity may be associated with an organization, such as an enterprise, group, or the like that accesses resources with a consistent set of permissions. The organization chart 122 may indicate the other identities associated with a target identity. In one aspect, the organization chart 122 may pertain to the members of an organization, entity, project, or group. However, in other aspects, the organization chart 122 may represent an association or grouping of identities that are related in some manner Once the peers, if any, are found, the permission management engine 132 obtains the resource usage history of each peer associated with a target identity. The resource usage history of a peer indicates each resource accessed, the permissions used to access the resource, the frequency in which the accesses are made, and the time period. (Collectively, block 502).

For each identity, the permission management engine 132 finds an aggregated set of permissions used to access the resources of its similar identities, its peers, and from its own usage. The permissions management engine 132 then uses this aggregated set of permissions as the predicted future usage of the identity. (Collectively, block 504).

Turning back to FIGS. 1 and 3, once the predicted future usage of an identity is generated, the set of least-privilege permissions is computed. For example, if a resource was only read and not altered and the identity had a permission that permitted changes, then the least-privilege permission for the resource would be changed to a read permission. The permission management engine 132 compares the permissions granted to an identity with the permissions of the predicted future usage, to determine the bare minimum permission that is needed for the identity to perform its tasks. (Collectively, block 310).

Once the bare minimum permissions are identified, the role corresponding to these permissions is determined (block 312). If there is a change to the configuration of a role of an identity, reconfiguration of the role may be applied (block 314). The permission management engine 132 may provide a notification issuing a recommendation to alter the role and/or permissions (block 314). Alternatively, the permission management engine 132 may reconfigure the role and/or permissions automatically or with acknowledgement from a user (block 314).

Exemplary Operating Environment

Figure 6:
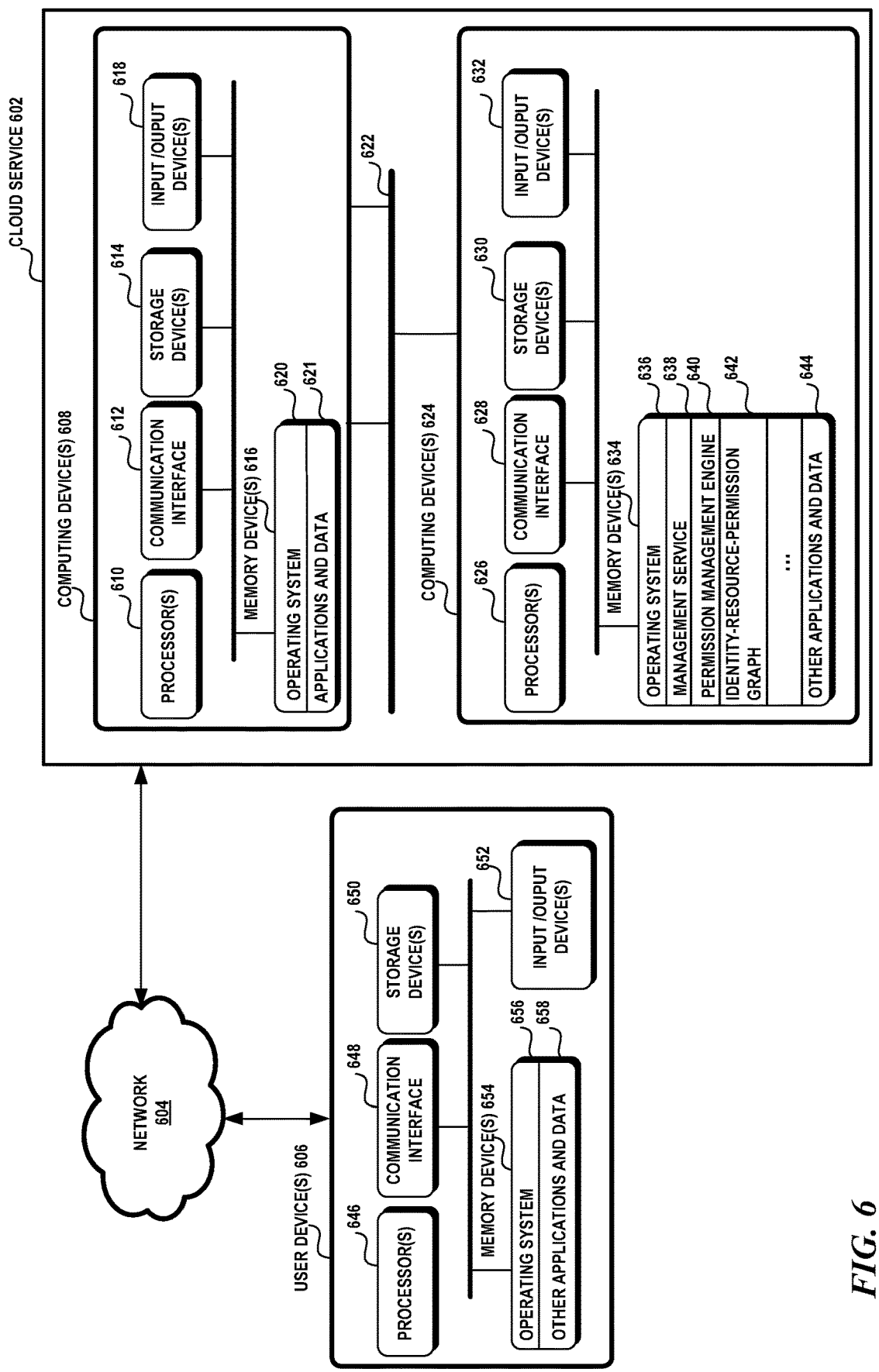
FIG. 6 is a block diagram illustrating an exemplary operating environment.

Attention now turns to a discussion of an exemplary operating environment. FIG. 6 illustrates an exemplary operating environment 600 in which a cloud service 602 is used to determine the least-privilege permissions for an identity. A cloud service 602 may include one or more computing devices 608, 624 coupled to a network 622. The cloud service may be coupled to one or more user devices 606 (i.e., computing devices) through a global network 604. However, it should be noted that the aspects disclosed herein is not constrained to any particular configuration of devices and that other configurations are possible.

A computing device 606, 608, 624 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, an Internet-of-Things (JOT) device, a distributed computing system, multiprocessor systems, or combination thereof. The operating environment 600 may be configured in a network environment, a distributed environment, a multi-processor environment, or a stand-alone computing device having access to remote or local storage devices.

A computing device 606, 608, 624 may include one or more processors 610, 626, 646, one or more communication interfaces 612, 628, 648, one or more storage devices 614, 630, 650, one or more input/output devices 618, 632, 652 and one or more memory devices 616, 634, 654. A processor 610, 626, 646 may be any commercially available or customized processor and may include dual microprocessors and multi-processor architectures. A communication interface 612, 628, 648 facilitates wired or wireless communications between the computing devices and other devices.

A storage device 614, 630, 650 may be computer-readable medium that does not contain propagating signals, such as modulated data signals transmitted through a carrier wave. Examples of a storage device 614, 630, 650 may include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices in a computing device. The input/output devices 618, 632, 652 may include a keyboard, mouse, pen, voice input device, touch input device, display, speakers, printers, etc., and any combination thereof.

A memory device 616, 634, 654 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory device 616, 634, 654 may also include one or more external storage devices or remotely located storage devices that do not pertain to propagated signals, such as modulated data signals transmitted through a carrier wave.

Memory devices 616 may include an operating system 620 and applications and data 621. Memory devices 634 may include an operating system 636, a management service 638, a permission management engine 640, an identity-resource-permission graph 642, and other applications and data 644. Memory devices 654 include an operating system 656 and other applications and data 658.

Networks 604, 622 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The networks 604, 622 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI)

model protocols, Session Initiated Protocol/Real-Time Transport Protocol (SIP/RTP), Short Message Service (SMS), Multimedia Messaging Service (MMS), or any other communication protocols and/or technologies.

Technical Effect

Aspects of the subject matter disclosed herein pertain to the technical problem of determining the bare minimum permission needed for an identity to access resources without disturbing its ongoing and future workflows. The technical features associated with addressing this problem involves predicting the actions that an identity will perform on resources in the future and the permissions needed to perform those actions. This predicted future resource usage is based on the actions taken by similar identities.

The resource usage history of similar identities is a good predictor of the future activities that may be performed by an identity on a resource. The identification of similar identities is made using the differences in node embeddings of a graph that represents the assigned permissions to a resource, the usage activity of the resources, and the permissions used to access the resources. The node embeddings are generated from a deep learning based model that considers the contextual and semantic similarities between identities represented in the graph.

In addition to the resource usage history of similar identities, the predicted future resource usage considers the resource usage history of the identity and the resource usage history of its peers. The permissions needed to perform the predicted future resource usage is compared with the current permission assignments to determine the bare minimum permissions needed for the identity without disrupting its ongoing and future workflows.

Conclusion

A system is disclosed comprising one or more processors coupled to a memory and one or more programs. The one or more programs are stored in the memory and configured to be executed by the one or more processors. The one or more programs including instructions that: represent assignments of permissions to a plurality of identities to perform actions on resources of a tenant of a cloud service in a graph, the graph having nodes and edges, a node representing an identity, permission, or resource, an edges representing an assignment of a permission or usage activity of an identity with a resource; find one or more similar identities as a first identity through node embeddings of each identity in the graph; predict future resource usage of the first identity based on usage activity of the one or more similar identities; and derive a bare minimum permission for the first identity based on the predicted future usage.

In one aspect, the one or more programs include further instructions that utilize an encoder to generate the node embeddings, the encoder trained on a plurality of random walk generated paths. In another aspect, the one or more programs include further instructions that determine that the first identity and a second identity are similar based on a difference between a node embedding of the first identity and a node embedding of the second identity.

In another aspect, the one or more programs include further instructions that compare permissions assigned to the first identity with permissions associated with the predicted future resource usage; and configure the bare minimum permission to facilitate the predicted future resource usage. An identity represents a user account, user group, application or process.

In yet other aspects, the one or more programs include further instructions that predict the future resource usage of the first identity based on resource usage history of the first identity. In addition, the one or more programs include further instructions that predict the future resource usage of the first identity based on resource usage history of peers of the first identity.

A method is disclosed comprising generating a graph representing permission assignments to resources of a tenant of a cloud service, the graph having nodes and edges, a node representing an identity, permission or resource, an edge representing an assignment of an identity with a permission to a resource or usage activity of a resource; computing a node embedding for each node representing an identity; utilizing the node embeddings to identify one or more similar identities to a first identity; and deriving a least-privilege permission for the first identity based on permissions used in resource usage history of the one or more similar identities.

The method further comprises determining a first similar identity to the first identity based on an inverse of a difference between a node embedding of the first similar identity and a node embedding of the first identity. The least-privilege permission for the first identity is based further on permissions used in a resource usage history of the first identity and on permissions used in a resource usage history of peers of the first identity. In some aspects, the node embeddings are derived using a convolutional neural network. In addition, the node embeddings are trained from random walk generated paths of the graph. In one aspect, the convolutional neural network uses a continuous bag of words technique to derive the node embeddings. An identity represents a user account, user group, application or process.

A computing device is disclosed comprising at least one processor and a memory. The at least one processor configured to: represent permissions assigned to an identity for a resource in a graph having nodes and edges, a node representing an identity, a permission or a resource, an edge representing an assignment of a permission to perform an action on a resource; overlay usage activity of each resource onto the graph; utilize an encoder to map paths through the graph into a node embedding for each identity node; determine similar identities in the graph to a first identity through differences in a node embedding of the first identity with node embeddings of other identities in the graph; and generate a least-privilege permission for the first identity based on a predicted future resource usage of the first identity, the predicted future resource usage based on resource usage history of the similar identities.

In one aspect, the encoder is a word2vec encoder and the identity represents a user account, a process, user group, or an application. In some aspects, the predicted future resource usage is further based on resource usage history of the first identity. In other aspects, the predicted future resource usage is further based on resource usage history of peers of the first identity.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
one or more processors coupled to a memory; and
one or more programs, wherein the one or more programs are stored in the memory and configured to be executed by the one or more processors, the one or more programs including instructions that:

represent assignments of permissions to a plurality of identities to perform actions on resources of a tenant of a cloud service in a graph, the graph having nodes and edges, a node representing an identity, permission, or resource, an edge representing an assignment of a permission or usage activity of an identity with a resource;
find one or more similar identities as a first identity through node embeddings of each identity in the graph;
predict future resource usage of the first identity based on usage activity of the one or more similar identities; and
derive a bare minimum permission for the first identity based on the predicted future usage.

2. The system of claim 1, wherein the one or more programs include further instructions that utilize an encoder to generate the node embeddings, the encoder trained on a plurality of random walk generated paths.

3. The system of claim 1, wherein the one or more programs include further instructions that:
determine that the first identity and a second identity are similar based on a difference between a node embedding of the first identity and a node embedding of the second identity.

4. The system of claim 1, wherein the one or more programs include further instructions that: compare permissions assigned to the first identity with permissions associated with the predicted future resource usage; and
configure the bare minimum permission to facilitate the predicted future resource usage.

5. The system of claim 1, wherein an identity represents a user account, user group, application or process.

6. The system of claim 1, wherein the one or more programs include further instructions that predict the future resource usage of the first identity based on resource usage history of the first identity.

7. The system of claim 1, wherein the one or more programs include further instructions that predict the future resource usage of the first identity based on resource usage history of peers of the first identity.

8. A method, comprising:
generating a graph representing permission assignments to resources of a tenant of a cloud service, the graph having nodes and edges, a node representing an identity, permission or resource, an edge representing an assignment of an identity with a permission to a resource or usage activity of a resource;
computing a node embedding for each node representing an identity;
utilizing the node embeddings to identify one or more similar identities to a first identity; and
deriving a least-privilege permission for the first identity based on permissions used in resource usage history of the one or more similar identities.

9. The method of claim 8, further comprising:
determining a first similar identity to the first identity based on an inverse of a difference between a node embedding of the first similar identity and a node embedding of the first identity.

10. The method of claim 8, wherein the least-privilege permission for the first identity is based further on permissions used in a resource usage history of the first identity.

11. The method of claim 8, wherein the least-privilege permission for the first identity is based further on permissions used in a resource usage history of peers of the first identity.

12. The method of claim 8, wherein the node embeddings are derived using a convolutional neural network.

13. The method of claim 12, wherein the convolutional neural network uses a continuous bag of words technique to derive the node embeddings.

14. The method of claim 8, wherein the node embeddings are trained from random walk generated paths of the graph.

15. The method of claim 8, wherein an identity represents a user account, user group, application or process.

16. A computing device, comprising:
at least one processor and a memory;
the at least one processor configured to:
represent permissions assigned to an identity for a resource in a graph having nodes and edges, a node representing an identity, a permission or a resource, an edge representing an assignment of a permission to perform an action on a resource;
overlay usage activity of each resource onto the graph;
utilize an encoder to map paths through the graph into a node embedding for each identity node;
determine similar identities in the graph to a first identity through differences in a node embedding of the first identity with node embeddings of other identities in the graph; and
generate a least-privilege permission for the first identity based on a predicted future resource usage of the first identity, the predicted future resource usage based on resource usage history of the similar identities.

17. The computing device of claim 16, wherein the encoder is a word2vec encoder.

18. The computing device of claim 16, wherein an identity represents a user account, a process, user group, or an application.

19. The computing device of claim 16, wherein the predicted future resource usage is further based on resource usage history of the first identity.

20. The computing device of claim 16, wherein the predicted future resource usage is further based on resource usage history of peers of the first identity.

* * * * *